(12) United States Patent
Li et al.

(10) Patent No.: US 9,412,547 B2
(45) Date of Patent: Aug. 9, 2016

(54) CONTACTOR

(75) Inventors: Ming Li, Shanghai (CN); Günther Schärtl, Freudenberg-Aschach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 124 days.

(21) Appl. No.: 14/364,529

(22) PCT Filed: Dec. 21, 2011

(86) PCT No.: PCT/CN2011/084346
§ 371 (c)(1),
(2), (4) Date: Jun. 11, 2014

(87) PCT Pub. No.: WO2013/091189
PCT Pub. Date: Jun. 27, 2013

(65) Prior Publication Data
US 2015/0294824 A1    Oct. 15, 2015

(51) Int. Cl.
*H01H 53/02*    (2006.01)
*H01G 5/14*    (2006.01)
*H01H 50/32*    (2006.01)
(Continued)

(52) U.S. Cl.
CPC .............. *H01H 53/02* (2013.01); *H01G 5/145* (2013.01); *H01H 50/32* (2013.01); *H01H 50/42* (2013.01); *H01H 51/10* (2013.01); *H01H 50/546* (2013.01); *H01H 2001/0063* (2013.01)

(58) Field of Classification Search
CPC ....... H01H 50/32; H01H 50/42; H01H 53/02; H01H 51/10; H01H 50/546; H01H 2001/0063; H01G 5/145
See application file for complete search history.

(56) References Cited

U.S. PATENT DOCUMENTS 4,616,202 A    10/1986    Kakizoe
5,828,138 A *  10/1998    McIver et al. ......... G01P 15/135
                                                    180/282
(Continued)

FOREIGN PATENT DOCUMENTS

CN    1317727 C    5/2007
CN    1317727 C    5/2007
(Continued)

OTHER PUBLICATIONS

M.E. Karagozler et al. "Electrostatic Latching for Inter-Module Adhesion, Power Transfer, and Communication in Modular Robots", IEEE International Conference on Intelligent Robots and Systems (IROS '07), pp. 1-8.

(Continued)

*Primary Examiner* — Mohamad Musleh
(74) *Attorney, Agent, or Firm* — Harness, Dickey & Pierce, P.L.C.

(57) ABSTRACT

A contactor includes a contact portion and an actuation portion. The contactor further includes a keeping portion. The keeping portion includes a capacitor structure and uses an electrostatic force between opposite plates of the capacitor structure to keep the contact portion in a contact state or a disconnection state. The electrostatic force generated by an electrostatic latch is used to keep the contactor in a switched-to static state. The contactor has reduced energy consumption in the static state, is convenient to manufacture, and has a low cost.

6 Claims, 11 Drawing Sheets

(51) Int. Cl.
H01H 50/42 (2006.01)
H01H 51/10 (2006.01)
H01H 50/54 (2006.01)
H01H 1/00 (2006.01)

(56) References Cited

U.S. PATENT DOCUMENTS

| | | | |
|---|---|---|---|
| 7,256,670 B2 | 8/2007 | Jahnes et al. | |
| 7,843,023 B2 | 11/2010 | Naito et al. | |
| 9,132,450 B2* | 9/2015 | Huang | B06B 1/0238 |
| 2003/0183008 A1* | 10/2003 | Bang | B81C 1/0019 |
| | | | 73/514.01 |
| 2006/0017533 A1 | 1/2006 | Jahnes et al. | |
| 2006/0131150 A1* | 6/2006 | Yuba | H01H 50/005 |
| | | | 200/329 |
| 2008/0078662 A1 | 4/2008 | Naito et al. | |
| 2010/0308944 A1 | 12/2010 | Kurashige et al. | |
| 2011/0102105 A1* | 5/2011 | Rogers | H01G 5/145 |
| | | | 333/186 |
| 2011/0220470 A1 | 9/2011 | Diem et al. | |

FOREIGN PATENT DOCUMENTS

| | | |
|---|---|---|
| CN | 101048838 A | 10/2007 |
| CN | 101048838 A | 10/2007 |
| JP | 2005/251549 A | 9/2005 |
| JP | 2005251549 A | 9/2005 |
| WO | WO 2011/021329 A1 | 2/2011 |
| WO | WO-2011021329 A1 | 2/2011 |

OTHER PUBLICATIONS

International Search Report PCT/ISA/210 for International Application No. PCT/CN2011/084346 Dated Jul. 10, 2012.
Written Opinion of the International Searching Authority PCT/ISA/237 for International Application No. PCT/CN2011/084346 dated Sep. 7, 2012.

* cited by examiner

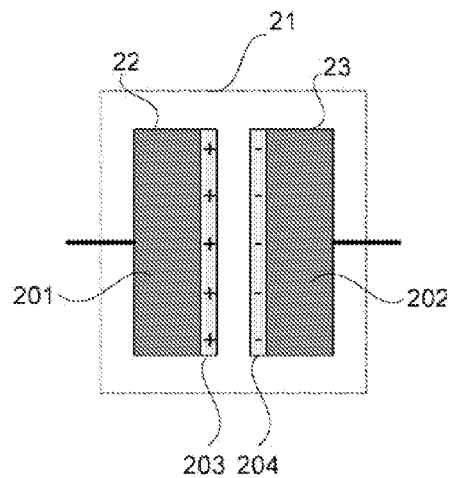
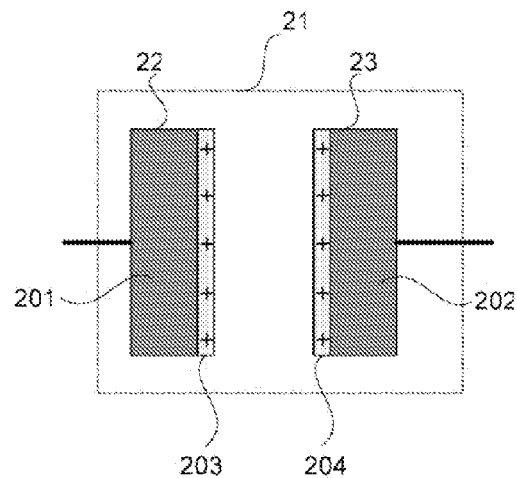
FIG. 2a  FIG. 2b
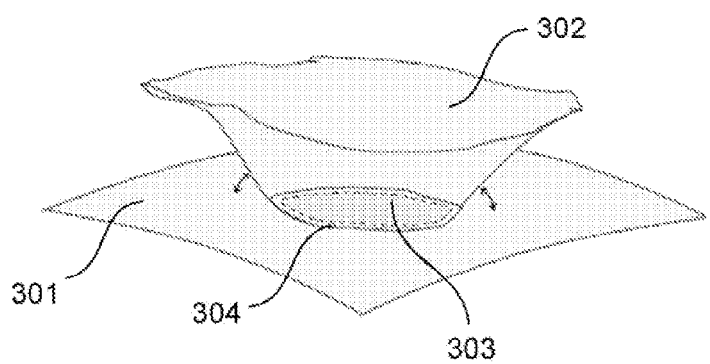
FIG. 3

CONTACTOR

PRIORITY STATEMENT

This application is the national phase under 35 U.S.C. §371 of PCT International Application No. PCT/CN2011/084346 which has an International filing date of Dec. 21, 2011, which designated the United States of America, the entire contents of each of which are hereby incorporated herein by reference.

FIELD

At least one embodiment of the present invention generally relates to the field of electrical apparatuses, and in particular, to a contactor.

BACKGROUND

In the industry field, a contactor is a common electrical apparatus, which can control turn-on/off of main-voltage/current supply through a lower voltage/current control signal. The contactor is applied widely in the industry field and can control electrical loads such as an electrical motor, an illumination apparatus, a heat supply apparatus, and a capacitor bank. In the applications, a function of the contactor is generally turning on or off a load power source line repeatedly.

The contactor generally includes either a Normal Open (NO) type or a Normal Close (NC) type contact system. A basic structure of the contactor is described in the following with reference to an NO-type contactor. The NO-type contactor may generally include a contact portion and an actuation portion. The contact portion is a portion in the contactor for bearing a load current, which is generally made of low-resistance metal (for example, copper or silver), and generally includes a static contact and a moving contact. When the static contact contacts the moving contact (the two contacts are closed), the load current is turned on, and when the static contact and the moving contact are disconnected from each other, the load current is turned off.

As the name implies, in the NO-type contactor, the static contact and the moving contact are kept in a disconnection state by using gravity or a spring force in a initial normal state; while the static contact and the moving contact of the contact portion are in a closed state in the switched-to non-normal state. After being actuated by electrical energy, the actuation portion can provide a required driving force, so that the contact portion is closed and the closed state is kept.

The NC-type contactor has a structure similar to that of the NO-type contactor. The difference is only that, in the NC-type contactor, the static contact and the moving contact are generally in the closed state in an initial state, and after being actuated, the actuation portion provides a driving force so that the static contact and the moving contact of the contact portion are disconnected from each other.

In the industry field, the most common contactor is an electromagnetic contactor, which controls opening and closing of the contactor through electromagnetic actuation. Documents 1 to 3, listed below, describe the electromagnetic contactor separately.

A basic operating principle of the electromagnetic contactor is described in the following with reference to FIG. 1. An electromagnetic contactor 1 is an NO-type contactor and includes a pair of static contacts 103 and 104, a pair of moving contacts 101 and 102, an electromagnet 106, an armature 105, a coil 108, and a spring 107. When a current is switched on for the coil 108, the armature 105 made of a magnetic material and the electromagnet 106 are actuated to have magnetism of opposite polarities. The armature 105 is opposite to the electromagnet 106 and is connected to the pair of moving contacts 101 and 102.

When the armature 105 and the electromagnet 106 have the magnetism, the armature 105 moves towards the electromagnet 106 and compresses the spring 107 under the action of an attractive force of the electromagnet 106. At this time, the moving contacts 101 and 102 move towards the static contacts 103 and 104 and contact the static contacts 103 and 104 respectively under driving of the armature 105, so that electrical energy flows through the contact portions to be provided to a load, thereby forming a load current. When the actuation current in the coil 108 is turned off, the magnetism of the armature 105 and electromagnet 106 disappears, the armature 105 moves away from the electromagnet 106 under action of an elastic restoring force of the spring 107, and the moving contacts 101 and 102 are disconnected from the static contacts 103 and 104 respectively under driving of the armature 105, so the load current is turned off.

In the foregoing description, when the current is switched on for the coil, the armature and the electromagnet attract each other due to opposite magnetic poles, but in a contactor with a different structure, an armature may also be made of a special material such as an anti-magnetic material, so that when a current is switched on for a coil, the armature and the electromagnet have the same magnetic poles and repel each other.

It can be seen from the foregoing embodiment that, according to the operating principle of the NO-type electromagnetic contactor, for the purpose of enabling the moving contact to move towards the static contact, the current needs to flow through the coil to magnetize the electromagnet, thereby generating an enough attractive force for attracting the armature. Meanwhile, if the closed state of the contactor needs to be kept, the current flowing through the coil needs to be kept to continuously provide the magnetism of the electromagnet and the attractive force for attracting the armature.

In other words, during a static period in which the NO-type electromagnetic contactor keeps the closed state, electrical energy consumption always exists in the coil of the contactor. The NC-type electromagnetic contactor has the similar situation. Especially, for example, in some industry applications such as electrical motors, energy consumed by the electromagnetic contactor during the static period is considerable.

Document 1: U.S. Pat. No. 4,616,202A
Document 2: U.S. patent application NO. US2010/0308944A1
Document 3: PCT patent application NO. WO2011/021329A1

SUMMARY

Accordingly, at least one embodiment of the present invention is directed to a contactor having low energy consumption, which consumes low electrical energy in a static state after the contactor is switched to a non-normal state.

According to an aspect of at least one embodiment of the present invention, a contactor is provided, which includes contact portion and an actuation portion. The contactor further includes a keeping portion. The keeping portion includes a capacitor structure and uses an electrostatic force between opposite capacitor plates of the capacitor structure to keep the contact portion in a contact state or a disconnection state.

Through the technical solution, in the contactor of at least one embodiment of the present invention, an electrostatic latch formed by the capacitor structure is used as the keeping portion, and the electrostatic force between the capacitor plates of the electrostatic latch is used to keep the contact portion in the contact state or the disconnection state after the contactor is switched to the non-normal state. Through the technical solution, the strong electrostatic force generated by the electrostatic latch is used to keep the contactor in the switched-to static state. Compared with a conventional electromagnetic contactor, the contactor used in at least one embodiment of the present invention greatly reduces energy consumption in the static state, is convenient to manufacture, and has a low cost.

Preferably, each of the capacitor plate of the capacitor structure includes an electrode and a dielectric film attached to a surface of the electrode. After the actuation portion causes the contact portion to switch to the contact state/disconnection state, the opposite capacitor plates in the capacitor structure of the keeping portion are capable of carrying charges, and an electrostatic force is generated between the electrodes of the capacitor plates to keep the contact portion in the switched-to contact state/disconnection state. The electrodes on the capacitor plates carry charges, so that the electrostatic force for keeping the contactor state is generated between the capacitor plates, and the dielectric films attached to the electrodes keep the electrodes insulated from each other when the capacitor plates are jointed with each other, thereby forming the electrostatic latch.

Preferably, the electrode of the capacitor plate is a flexible thin metallic film. In this way, even if a distance between the capacitor plates is long, a large electrostatic force may also be generated between the flexible thin metallic films, so as to keep a stable state of the contactor.

Preferably, the dielectric film is ebonite, polytetrafluoroethylene (PTFE), or ceramics. The non-conductor dielectric film may be made of a material of great non-conductor strength, for example, ebonite, PTFE, or ceramics. In this way, the material of great non-conductor strength is used as the material of the non-conductor dielectric film, so that the non-conductor dielectric film is not broken down by a possibly generated electrical arc, so as to ensure that the electrostatic latch may keep the stable state of the contactor.

Preferably, the capacitor plate further includes a substrate, and the flexible thin metallic film electrode is attached to the substrate. The substrate may provide certain rigid support for the electrode, further ensuring an enough keeping force.

Preferably, the contact portion includes a moving contact and a static contact, one of the opposite capacitor plates of the capacitor structure is connected to the moving contact, and the other one is connected to the static contact. After the actuation portion causes the contact portion to switch to the contact state/disconnection state, the opposite capacitor plates in the capacitor structure of the keeping portion are capable of carrying charges of opposite polarities or the same polarity, and an electrostatic attractive/repulsive force is generated between the electrodes of the capacitor plates to keep the contact portion in the switched-to contact state/disconnection state. In the case that the keeping portion and the contact portion are connected, the electrostatic latch provides a strong keeping force, thereby stably keeping the state of the contactor.

Preferably, the contact portion includes an electromagnet and an armature, one of the opposite capacitor plates of the capacitor structure is connected to the electromagnet, and the other one is connected to the armature. After the actuation portion causes the contact portion to switch to the contact state/disconnection state, the opposite capacitor plates in the capacitor structure of the keeping portion are capable of carrying charges of opposite polarities or the same polarity, and an electrostatic attractive/repulsive force is generated between the electrodes of the capacitor plates to keep the contact portion in the switched-to contact state/disconnection state. In the case that the keeping portion and the contact portion are connected and the moving contact is located above the static contact, the electrostatic latch provides a strong keeping force, thereby stably keeping the state of the contactor.

Preferably, each of the opposite capacitor plates of the capacitor structure further include a substrate, a plurality of protrusion plates is disposed on each of the substrates of the opposite capacitor plates, the plurality of protrusion plates of one of the opposite capacitor plates is capable of meshing with the plurality of protrusion plates of the other one of the opposite capacitor plates, and the electrode is disposed on both surfaces of each of the plurality of protrusion plates. After the actuation portion causes the contact portion to switch to the contact state/disconnection state, the electrodes of the protrusion plates of the opposite capacitor plates are capable of carrying charges of opposite polarities or the same polarity, and an electrostatic attractive/repulsive force is generated between adjacent electrodes in a mesh state to keep the contact portion in the switched-to contact state/disconnection state. The plurality of electrostatic latches of a mesh structure forms the keeping portion, and an electrostatic shear force between the electrodes of the electrostatic latch may ensure that a stronger keeping force is generated between the electrodes, thereby more stably keeping the state of the contactor.

Preferably, the contact portion includes an electromagnet and an armature, one of the opposite capacitor plates of the capacitor structure is connected to the electromagnet, and the other one is connected to the armature. After the actuation portion causes the contact portion to switch to the contact state/disconnection state, the opposite capacitor plates in the capacitor structure of the keeping portion are capable of carrying charges of the same polarity or opposite polarities, and an electrostatic repulsive/attractive force is generated between the electrodes of the capacitor plates to keep the contact portion in the switched-to contact state/disconnection state. In the case that the keeping portion and the contact portion are connected and the moving contact is located below the static contact, the electrostatic latch provides a strong keeping force, thereby stably keeping the state of the contactor.

Preferably, each of the opposite capacitor plates of the capacitor structure further include a substrate, a plurality of protrusion plates is disposed on each of the substrates of the opposite capacitor plates, the plurality of protrusion plates of one of the opposite capacitor plates is capable of meshing with the plurality of protrusion plates of the other one of the opposite capacitor plates, and the electrode is disposed on both surfaces of each of the plurality of protrusion plates. After the actuation portion causes the contact portion to switch to the contact state/disconnection state, the electrodes of the protrusion plates of the opposite capacitor plates are capable of carrying charges of the same polarity or opposite polarities, and an electrostatic repulsive/attractive force is generated between adjacent electrodes in a mesh state to keep the contact portion in the switched-to contact state/disconnection state. The plurality of electrostatic latches of a mesh structure forms the keeping portion, and an electrostatic shear force between the electrodes of the electrostatic latch may ensure that a stronger keeping force is generated between the electrodes, thereby more stably keeping the state of the contactor.

BRIEF DESCRIPTION OF THE DRAWINGS

The features, technical features, advantages, and embodiments of the present invention are further described in the following through the example embodiments and with reference to accompanying drawings, wherein:

FIG. 2a and FIG. 2b are schematic structural diagrams of a keeping portion of a contactor according to a first embodiment of the present invention;

FIG. 3 is a schematic diagram of a flexible electrode and a peeling effect according to a second embodiment of the present invention;

LIST OF REFERENCE NUMERALS

Figure 1:
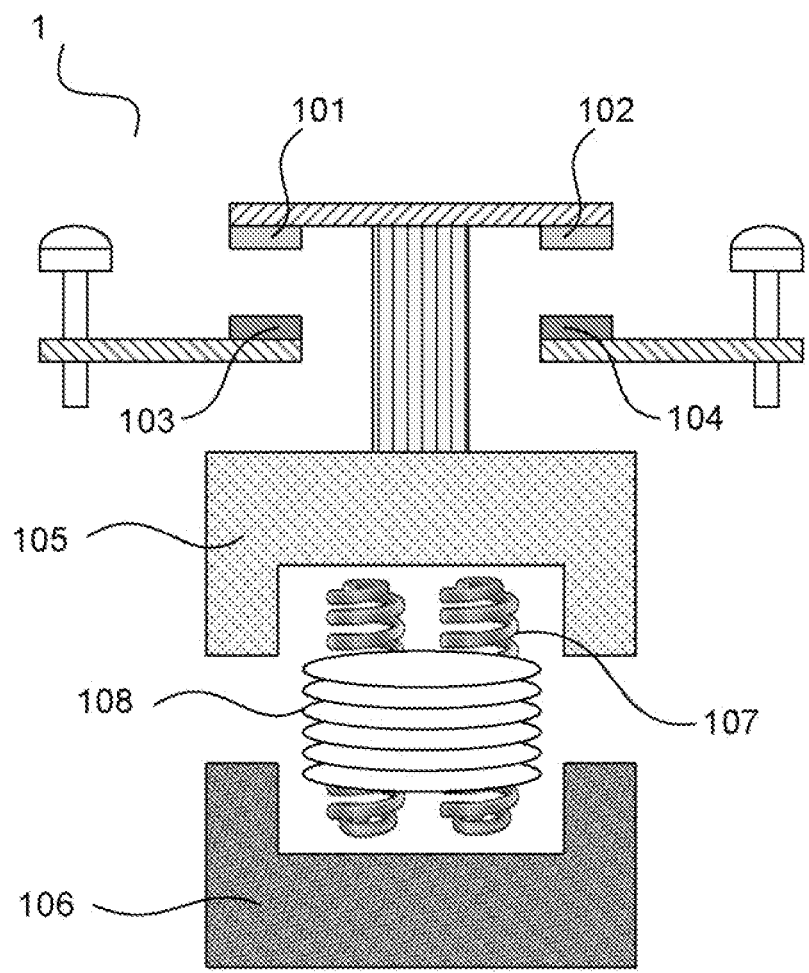
FIG. 1 is a basic schematic structural diagram of an electromagnetic contactor in the prior art.

1 Electromagnetic contactor
101 Moving contact
102 Moving contact
103 Static contact
104 Static contact
105 Armature
106 Electromagnet
107 Spring
108 Coil
21 Electrostatic latch
22 Capacitor plate
23 Capacitor plate
201 Plastic plate
202 Plastic plate
203 Electrode
204 Electrode
301 Flexible electrode
302 Flexible electrode
303 Tight jointing region
304 Edge region
41 Capacitor plate
42 Capacitor plate
410 Substrate
411 Protrusion plate
412 Electrode
5 Contactor
501 Moving contact
502 Moving contact
503 Static contact
504 Static contact
505 Armature
506 Electromagnet
507 Spring
508 Coil
509 Capacitor plate
510 Capacitor plate
6 Contactor
601 Moving contact
602 Moving contact
603 Static contact
604 Static contact
605 Armature
606 Electromagnet
607 Spring
608 Coil
609 Capacitor plate
610 Capacitor plate
7 Contactor
701 Moving contact
702 Moving contact
703 Static contact
704 Static contact
705 Armature
706 Electromagnet
707 Spring
708 Coil
709 Capacitor plate
710 Capacitor plate
8 Contactor
801 Moving contact
802 Moving contact
803 Static contact
804 Static contact
805 Armature
806 Electromagnet
807 Spring
808 Coil
809 Capacitor plate
810 Capacitor plate

DETAILED DESCRIPTION OF THE EXAMPLE EMBODIMENTS

In at least one embodiment of the present invention, a structure for keeping a contactor in a closed state or a disconnection state by using an electrostatic force is called an electrostatic latch. At least one embodiment of the present invention provides a new contactor, which uses one or more electrostatic latches as a keeping portion of the contactor. The electrostatic latches may provide a capacitive coupling and capacitive decoupling effect to keep electrical contacts (a static contact and a moving contact) in a closed state or a disconnection state through a capacitive coupling and capacitive decoupling effect. Through the new contactor in the present invention, the disconnection state or the closed state of the contactor may be kept by using very small energy.

It should be noted that, the contactor of at least one embodiment of the present invention may be implemented as an NO-type or an NC-type. Through the two types, the same technical effect may be obtained, and the difference is only that, polarities of charges carried in the electrostatic latches in the keeping portions of the contactors and types of electrostatic forces generated accordingly are different. The technical features of at least one embodiment of the present invention are described by taking the NO-type contactor as an example in the following description and specific embodiments. Persons skilled in the art may also easily design a different type of NC-type contactor according to the principle and script of the present invention. Obviously, the protection scope of the present invention is not limited to a specific NC-type or NC-type contactor.

Each electrostatic latch in the contactor of at least one embodiment of the present invention includes a capacitor structure. The capacitor structure may include a pair of capacitor plates, and each capacitor plate may at least include a conductive electrode and a layer of non-conductor film covering a surface of the electrode. The non-conductor film provides insulation between electrodes.

Preferably, the capacitor plate may also further include a substrate made of a dielectric material, and the electrode covered by the non-conductor film is attached to the substrate. When the contactor works, an electrostatic force between two capacitor plates is used as a keeping mechanism, so that the moving contact and the static contact of the contactor are kept in the closed sate.

In the following, a specific operating principle of the electrostatic latch is first described.

When the two capacitor plates are placed closely in parallel with each other, the capacitor is charged so that the two capacitor plate carries charges of different polarities. At this time, electrostatic forces attracting each other are generated between the two capacitor plates due to the charges of different polarities carried on the capacitor plates, so that the two capacitor plates are close to each other and are jointed finally, thereby implementing closing of the electrostatic latch.

Energy required to enable the electrostatic latch to be closed is very small, and a theoretical value of the energy is only the charges stored by the capacitor, that is, the charges stored on the electrodes of the two capacitor plates for forming the capacitor. A capacitance value of the formed electrostatic latch is very small (only tens of nF), and a voltage for charging the capacitor is only hundreds of volts, so the energy consumed by the closing of the electrostatic latch is calculated according to the following formula (1) and is only tens of milli-joules.

$$E = \tfrac{1}{2} \times C \times U^2 \tag{1}$$

E is energy consumption, C is a capacitance value, and U is a value of a voltage for charging a capacitor.

If charge leakage in the capacitor is ignored, the charges stored in the two capacitor plates can keep an electrostatic attractive force between the two capacitor plates, thereby keeping the electrostatic latch in the closed state. Therefore, in a static closed state of the electrostatic latch, none of additional energy is required.

When the capacitor is discharged, the electrostatic attractive force for keeping the electrostatic latch closed disappears accordingly. At this time, if the two capacitor plates of the electrostatic latch are intended to be disconnected from each other, the method is similar to the method of enabling the electrostatic latch to be closed. The difference is only that, charges of the same polarity are applied to the two capacitor plates at this time, and an electrostatic repulsive force generated between the two capacitor plates makes the two capacitor plates repel each other and keep far away from each other.

For a structure and basic principle of the electrostatic latch, reference may be made to a reference document 4: M. E. Karagozler, Jason Campell, and et. al. Electrostatic Latching for Inter-module Adhesion, Power Transfer, and Communication in Modular Robots. IEEE International Conference on Intelligent Robots and Systems, pp. 2779~2786, 2007.

In at least one embodiment of the present invention, a thin metallic film may be applied as the electrode of the electrostatic latch to flexibly obtain a closer space between the capacitor plates and generate a large electrostatic force. After the flexible electrodes carry the charges of different polarities, even if an initial distance between the electrodes is long, a generated small electrostatic force can enable the electrodes to trend to be bent to be closer to each other, so the space between electrodes is reduced and a larger electrostatic force is generated accordingly. Based on the positive feedback mechanism, the capacitor plates move so that the space between the electrodes is increasingly smaller until the capacitor plates are completely jointed together. At this time, the space between the electrodes is only a sum of thickness of the two non-conductor films on the surfaces of the electrodes, so a very large jointing force is generated between the electrodes.

For a technology of applying the thin metallic film on the capacitor plate as the electrode, reference may also be made to reference document 5: M. E. Karagozler. Harnessing Capacitance for Inter-Robot Latching, Communication, and Power Transfer. Master Thesis, Carnegie Mellon University, 2007.

A material of a non-conductor dielectric film should also be considered. That's because when the flexible electrodes are completely jointed together, the space between the electrodes is only the sum of thickness of the two non-conductor films on the surfaces of the electrodes, and the total thickness is about $12 \times 10^{-6}$ m. Such a short distance easily generates an electrical arc, and the material of the non-conductor film should bear the electrical arc and cannot be broken down. An operating voltage of the electrostatic latch is generally not higher than 500 V, so non-conductor strength of the material of the non-conductor film should be at least greater than $500\ \text{V}/(12 \times 10^{-6}\ \text{m}) \approx 41$ MV/m. According to the standard, ebonite (having non-conductor strength of 50 MV/m), polytetrafluoroethylene (PTFE, having non-conductor strength of 60 MV/m), or ceramics (having non-conductor strength of 100-10000 MV/m) can be selected as the material of the non-conductor dielectric film.

Moreover, the flexible electrode is affected by a peeling effect. That is to say, surfaces of the electrodes are easily separated in the case that a part of surfaces are separated, so even if a small part of the surfaces are not completely jointed, the surfaces of the two electrodes are gradually separated due to a small peeling force until the surfaces are completely separated from each other. For the purpose of solving the problem and improving a continuous jointing degree, preferably, the contactor of an embodiment of the present invention includes a plurality of electrostatic latches, and the plurality of electrostatic latches is disposed with a mesh structure, so that a closing direction of the electrostatic latch is designed to be parallel to a contact surface of the flexible electrode. In this way, the electrostatic force generated in the electrostatic latch acts in a direction parallel to the surface of the electrode and not perpendicular to the surface of the electrode as usual, so the electrostatic force in this direction is called a shear force. When the electrostatic latch is actuated, a maximized shear force can quickly act on the whole surfaces of the electrode, so the two electrodes are completely jointed.

In a part of embodiments of the present invention, the keeping portion of the contactor may include a pair of capacitor plates and the plurality of electrostatic latches forming the mesh structure on the opposite capacitor plates.

The capacitive electrostatic attractive force or repulsive force generated by the electrostatic latch is inversely proportional to a square of a distance between the electrodes. That is to say, when the distance between the two capacitor plates is long, an initial capacitive electrostatic attractive force between the two plates is very small, and it may be difficult to enable the capacitor plate to move to be close to each other. In this case, an additional force may be provided to enable a moving capacitor plate to move towards a static capacitor plate so that the distance between the moving capacitor plate and the static capacitor plate is below a specific value, and the electrostatic attractive force between the two plates is large enough to enable the electrostatic latch to be closed. For achieving the purpose, a conventional electromagnetic actuation mechanism is adopted for an actuation portion of the contactor in the present invention so that the two capacitor plates are close to each other and are closed. Once the two capacitor plates are in the closed state, the electrostatic force generated by the electrostatic latch in the keeping portion is enough to keep the capacitor plates in the closed state. At this time, an electromagnetic force provided by the actuation portion is not required. Therefore, power supplied by the electrostatic actuation portion may be turned off at this time, thereby achieving the technical effect of saving energy.

It can be known from the foregoing that, the contactor of an embodiment of the present invention uses the electrostatic latch formed by the capacitor plates as the keeping portion of the contactor, which uses the electrostatic force between the capacitor plates to keep the contacts of the contactor in a contact state or a disconnection state. Therefore, after the actuation portion completes a dynamic process of closing or disconnecting of the contacts, no additional energy is required to maintain a static state of contact or disconnection of contacts of the contactor. Therefore, compared with a conventional electromagnetic contactor, the new contactor of an embodiment of the present invention can greatly reduce the energy consumption.

Preferably, in an embodiment of the present invention, the plurality of electrostatic latches of the mesh structure may be adopted. In this way, the electrostatic shear force between the flexible electrodes of the electrostatic latches can ensure the tight jointing between the flexible electrodes, thereby ensuring the tight contact between the contacts. Experiments show that, when the power source applies an actuation voltage of 500 V to the capacitor plates, an electrostatic force of 0.6 $N/cm^2$ can be generated. If a size of the actuation portion is about 6 cm*5 cm*4 cm, an electrostatic force of 10 N to 20 N can be generated.

The contactor of an embodiment of the present invention uses the electrostatic latch as a basic keeping portion. The capacitor plate of the electrostatic latch may be made of a plastic plate attached by a thin metallic film electrode. A material of the thin metallic film is common metal such as copper or aluminum, so the cost of the device is low. Moreover, the power source cooperating with the keeping portion only needs to have the function of converting a industrial 24 V direction current (DC) power source into a high operating voltage (for example, a 500 V DC power source), which has a low cost and is easily implemented.

First Embodiment

The first embodiment shows a basic embodiment of the present invention. In this embodiment, a contactor uses an electrostatic latch as a keeping portion. FIG. 2a and FIG. 2b show a structure and an operating principle of the keeping portion in the contactor.

In the electrostatic latch 21, two capacitor plates 22 and 23 parallel to each other form a capacitor structure. The capacitor plate 22 includes a plastic plate 201 and an electrode 203 attached on the plastic plate 201, and the capacitor plate 23 includes a plastic plate 202 and an electrode 204 attached on the plastic plate 202. For the purpose of maintaining insulation when the electrodes attract each other and are jointed, very thin non-conductor dielectric films (not shown) are attached to surfaces of the electrode 203 and the electrode 204 facing each other.

When the capacitor plate 22 and the capacitor plate 23 of the electrostatic latch are charged so that the electrode 203 and the electrode 204 carry charges of different polarities respectively (as shown in FIG. 2a), an electrostatic attractive force is generated between the electrode 203 and the electrode 204. The electrostatic attractive force enables the two capacitor plates 22 and 23 attract each other, and a distance between the capacitor plate 22 and the capacitor plate 23 are increasingly small until the capacitor plate 22 and the capacitor plate 23 are jointed together. When the capacitor plate 22 and the capacitor plate 23 are jointed together, a distance between the electrode 203 and the electrode 204 is only a sum of thickness of the two non-conductor films, and the electrostatic attractive force between the electrode 203 and the electrode 204 can keep the closed state of the electrostatic latch.

When the capacitor plate 22 and the capacitor plate 23 of the electrostatic latch are charged so that the electrode 203 and the electrode 204 carry charges of the same polarity (as shown in FIG. 2b), an electrostatic repulsive force is generated between the two electrodes 203 and 204. The electrostatic repulsive force enables the two capacitor plates 22 and 23 to be far away from each other, thereby keeping the disconnection state of the electrostatic latch.

Second Embodiment

As stated in the first embodiment, when the two capacitor plates of the electrostatic latch are jointed together to implement the closing of the electrostatic latch, the distance between the two electrodes is only the thickness of the two thin non-conductor films. If a rigid and thick metal plate (for example, an aluminum plate) is used to form the electrode of the electrostatic latch, even if a surface of the electrode is somewhat coarse or is attached with tiny objects, the distance between the electrodes is greatly increased near a coarse position or an attachment position, thereby affecting the closing of the electrostatic latch. Therefore, on the basis of the first embodiment, in this embodiment, a flexible thin metallic film (for example, a copper film or an aluminum film) is adopted to form the electrode of the electrostatic latch. Specifically, the electrode of one of the capacitor plates may be the flexible thin metallic film, or the electrodes of the two capacitor plates may be the flexible thin metallic films. A jointing effect of the flexible electrodes implemented in this manner is shown in FIG. 3.

FIG. 3 shows a flexible electrode 301 located in a lower part of the figure and a flexible electrode 302 located in an upper part of the figure. When the corresponding capacitor plates are charged so that the electrode 301 and the electrode 302 carry charges of different polarities, an electrostatic attractive force is generated between the electrode 301 and the electrode 302. At the beginning, since a distance between the electrode 301 and the electrode 302 is long, the electrostatic attractive force between the electrode 301 and the electrode 302 is small. However, the electrode 301 and the electrode 302 have a flexible property, so the electrode 301 and the electrode 302 are bent to each other under a small attractive force, as shown in FIG. 3. Thereby, the distance between the electrode 301 and the electrode 302 is reduced, thereby generating a greater electrostatic attractive force until the two electrodes are jointed together, and a large electrostatic attractive force exists between the electrode 301 and the electrode 302.

Third Embodiment

As stated in the second embodiment, the flexible thin metallic films may be directly disposed on the two opposite capacitor plates as the electrodes of the electrostatic latch. However, the flexible electrode is possibly affected by a peeling effect. That is to say, when a part of surface regions of the two flexible electrodes are not completely jointed, regions around the regions are gradually separated due to a peeling force generated by a peeling effect until the two flexible electrodes are completely separated from each other.

As shown in FIG. 3, a region 303 is a tight jointing portion of the flexible electrodes 301 and 302, but in a region 304 at the edge of the region 303, the flexible electrodes 301 and 302 are not completely jointed. If the electrode 301 and electrode 302 are separated in the region 304, the separation propagates to the tight jointing region 303 adjacent to the region 304. At this time, even a very small peeling force enables the electrode 301 and electrode 302 to be gradually separated in the region 304 until the electrode 301 and electrode 302 are completely separated from each other.

Figure 4A:
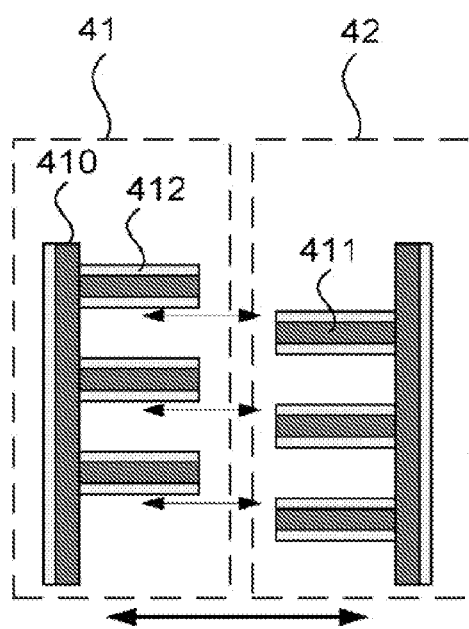
FIG. 4a and FIG. 4b are schematic structural diagrams of a keeping portion of a contactor according to a third embodiment of the present invention.
Figure 4B:
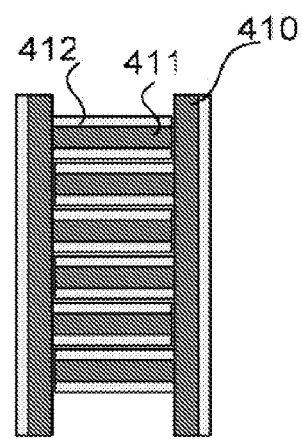

For the purpose of avoiding the undesired effect possibly brought by the peeling effect, in the third embodiment of the present invention, on the basis of the foregoing embodiment, a plurality of electrostatic latches is used in the keeping portion of the contactor, and the plurality of electrostatic latches is designed with a mesh structure. FIG. 4a and FIG. 4b show a structure and an operating principle of the plurality of electrostatic latches in the keeping portion of the contactor according to the third embodiment of the present invention.

As shown in FIG. 4A, the keeping portion of the contactor in the third embodiment mainly includes two capacitor plates 41 and 42. The capacitor plate 41 and the capacitor plate 42 have the similar structure. In both of the capacitor plate 41 and the capacitor plate 42, a plurality of protrusion plates 411 (for example, plastic plates 411) perpendicular to a plastic substrate 410 is disposed on the plastic substrate 410. Flexible electrodes 412 made of thin metallic films are attached to two sides of the plastic plate 411 shown in the figure. A very thin non-conductor dielectric film (not shown) is attached to each of the electrodes 412. Two planes of the two plastic substrate 410 disposed with the plastic plate 411 are placed opposite. Positions and sizes of the plurality of plastic plates 411 are disposed, so that when the capacitor plate 41 and the capacitor plate 42 move towards each other, the plurality of plastic plates 411 on the two plastic substrates 410 may be meshed with each other so that adjacent electrodes 412 can be jointed together. Each pair of electrodes 412 jointed with each other forms an electrostatic latch. As shown FIG. 4a, the actuation portion includes five electrostatic latches.

It can be seen that, when charges of different polarities are applied to the capacitor plate 41 and the capacitor plate 42 so that the capacitor plate 41 and the capacitor plate 42 move towards each other, a combination direction of the capacitor plate 41 and the capacitor plate 42 is parallel to a surface of the electrode 412, so an electrostatic attractive force generated between the two electrodes 412 of each electrostatic latch is a shear force in the combination direction instead of a shear force perpendicular to the surface of the electrode in the foregoing embodiment. This shear force acts on whole surface regions of the electrodes 412 immediately when the electrodes 412 contacts with each other, so that the electrodes 412 are tightly jointed, thereby avoiding the affection of the peeling effect.

After the plurality of electrostatic latch is closed, the capacitor plate 41 and the capacitor plate 42 are combined together to form a merged structure shown in FIG. 4b. At this time, the multiple pairs of electrodes 412 on the capacitor plate 41 and the capacitor plate 42 are tightly jointed together, and a very large electrostatic attractive force is kept between the capacitor plate 41 and the capacitor plate 42.

Fourth Embodiment

Figure 5A:
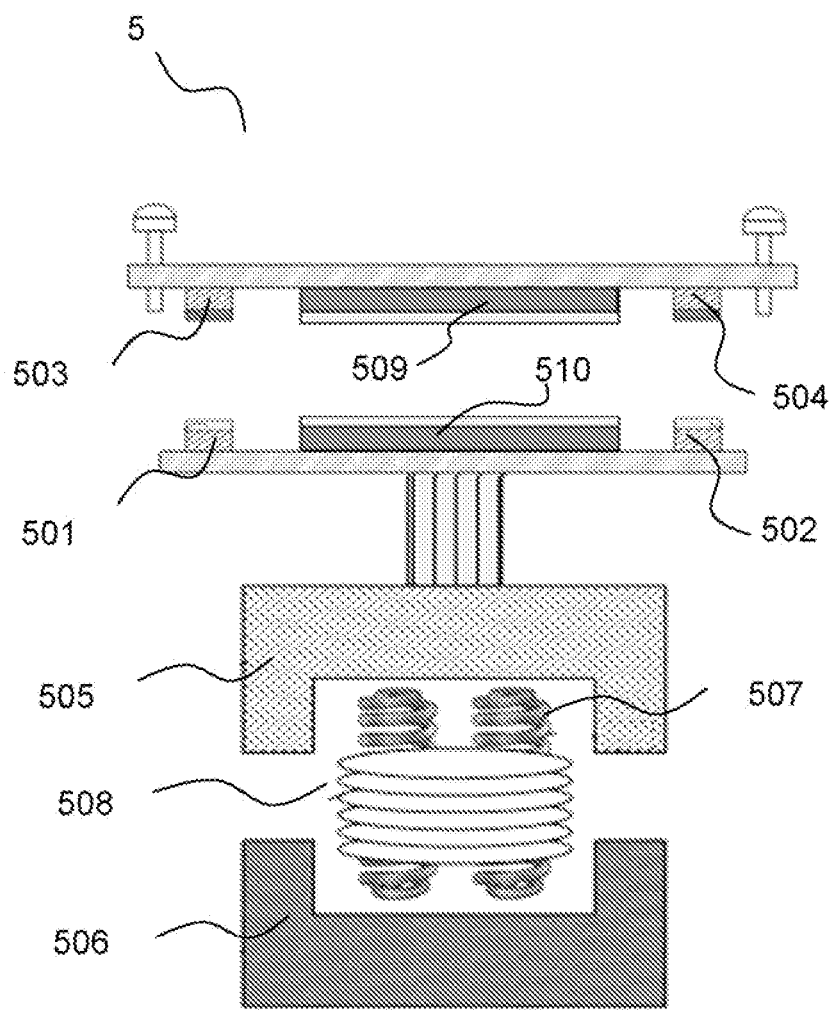
FIG. 5a and FIG. 5b are schematic structural diagrams of an NO-type contactor according to a fourth embodiment of the present invention.
Figure 5B:
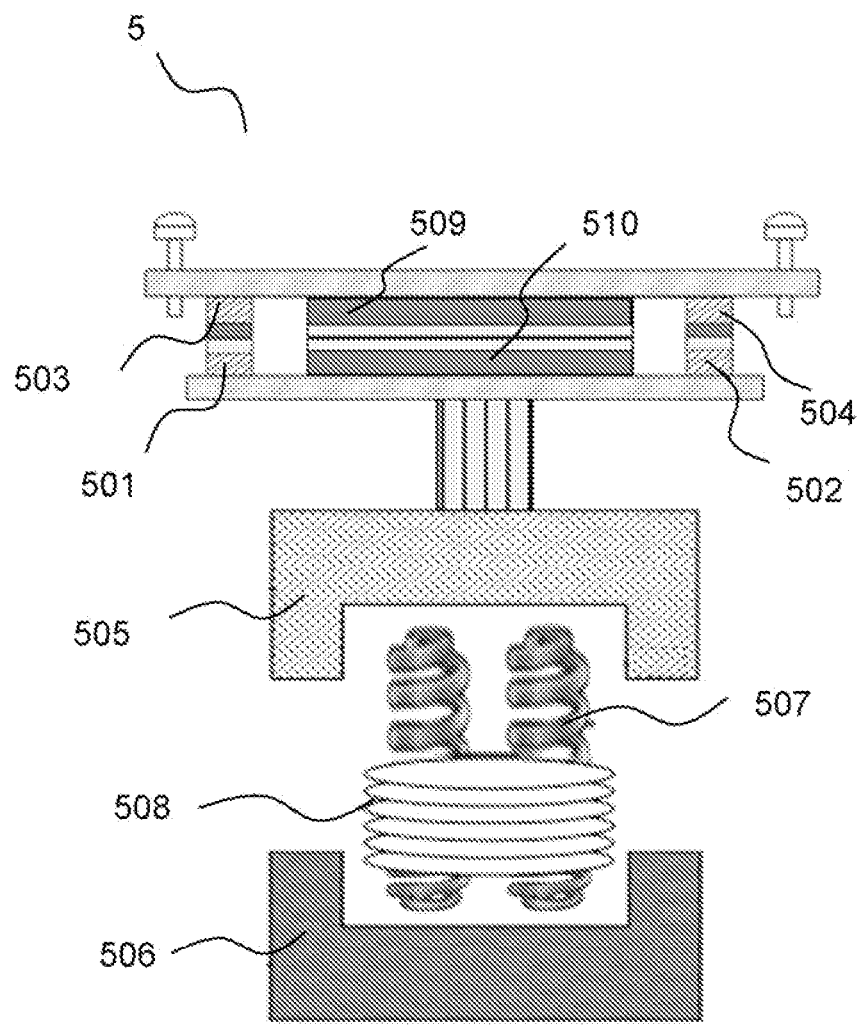

The electrostatic latch in the first embodiment may be used as a keeping portion of a contactor to provide an electrostatic attractive force for keeping a moving contact and a static contact in a closed state. FIG. 5a and FIG. 5b show a structure and an operating principle of an NO-type contactor according to the fourth embodiment. FIG. 5a shows an NO state of the contactor 5, and FIG. 5b shows that the contactor 5 is in the closed state under a keeping action of the keeping portion.

As shown in FIG. 5a and FIG. 5b, the contactor 5 is an NO-type contactor, including a contact portion and an actuation portion. The contact portion includes a pair of static contacts 503 and 504, a pair of moving contacts 501 and 502. The actuation portion includes an electromagnet 506, an armature 505, a coil 508, and a spring 507. Moreover, the NO-type contactor further includes a keeping portion. The keeping portion includes a pair of capacitor plates 509 and 510 and has the same basic structure as the keeping portion in the first embodiment. The capacitor plate 509 are mechanically connected to the pair of static contacts 503 and 504 by bearing a structure of the pair of static contacts 503 and 504, and the capacitor plate 510 are mechanically connected to the pair of moving contacts 501 and 502 by bearing a structure of the pair of moving contacts 501 and 502. As shown in FIG. 5a, a current is not switched on for the coil 508. At this time, no interaction force exists between the electromagnet 506 and the armature 505, and the pair of static contacts 503 and 504 and the pair of moving contacts 501 and 502 are kept in a disconnection state. At this time, the contactor 5 is in the NO state shown in FIG. 5 a.

As shown in FIG. 5b, when the current is switched on for the coil 508, the armature 505 and the electromagnet 506 are actuated to have magnetism of the same polarity. The armature 505 is opposite to the electromagnet 506 and is connected to the pair of moving contacts 501 and 502. When the armature 505 and the electromagnet 506 have the magnetism, the armature 505 moves away from the electromagnet 506 and stretches the spring 507 under the action of a repulsive force of the electromagnet 506. Once the pair of moving contacts 501 and 502 contacts the pair of static contacts 503 and 504, the pair of capacitor plates 509 and 510 in the keeping portion of the contactor 5 is in a very close state or even a contact state, as shown in FIG. 5b. At this time, a voltage is applied to the keeping portion to charge the capacitor plates 509 and 510 so that the capacitor plates 509 and 510 carry charges of different polarities. In this way, a strong electrostatic attractive force is generated between the capacitor plates 509 and 510, so that the pair of moving contacts 501 and 502 and the pair of static contacts 503 and 504 are fixedly locked (kept) in the contact state. At this time, the current in the coil 508 may be cancelled, and the contact state of the contactor 5 is maintained only by the electrostatic attractive force between the capacitor plates 509 and 510. In this way, the actuation portion does not consume power energy in the kept static state.

When application of the voltage to the keeping portion is stopped, the capacitor plates 509 and 510 do not carry the charges, and the electrostatic attractive force does not exist between the capacitor plates 509 and 510. At this time, an elastic restoring force of the spring 507 pulls the armature 505 back to an original position shown in FIG. 5a, and the pair of moving contacts 501 and 502 connected to the armature 505 is also separated from the pair of static contacts 503 and 504 under the drawing of the armature 505, so the contactor 5 returns to the disconnection state shown in FIG. 5 a.

According to this embodiment, the electrostatic latch provides a strong keeping force, thereby stably keeping the switched-to closed state after the contactor and reducing static energy consumption of the contactor.

Fifth Embodiment

Figure 6A:
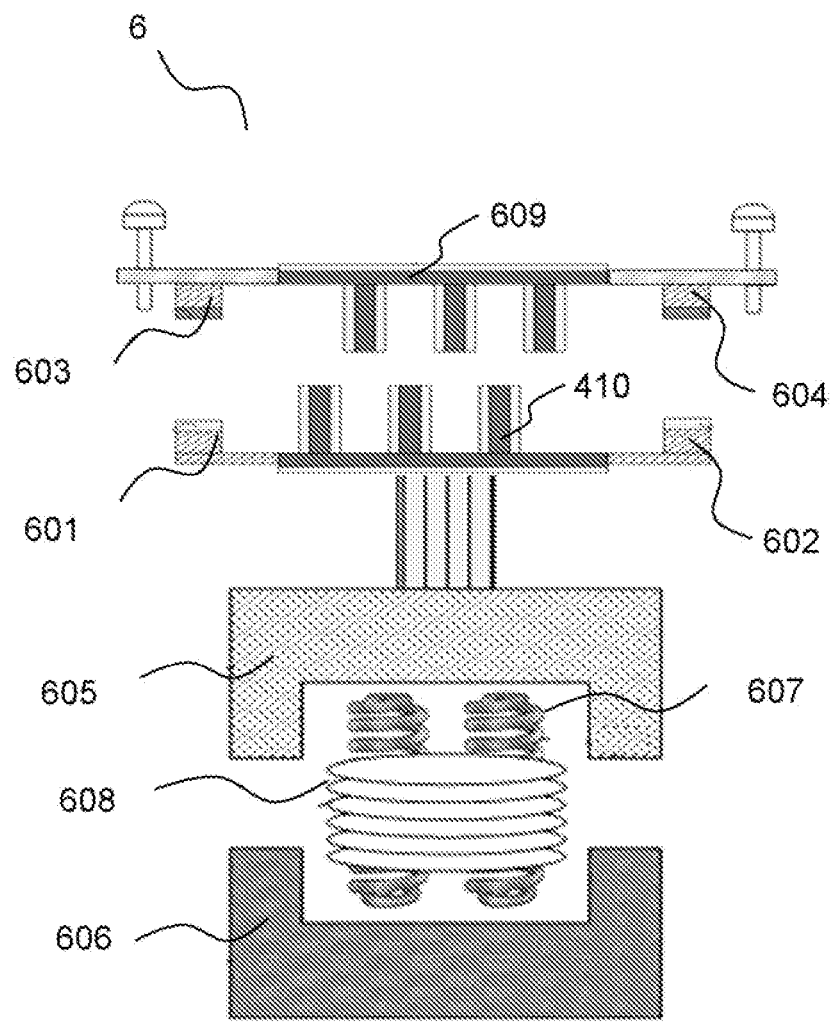
FIG. 6a and FIG. 6b are schematic structural diagrams of an NO-type contactor according to a fifth embodiment of the present invention.
Figure 6B:
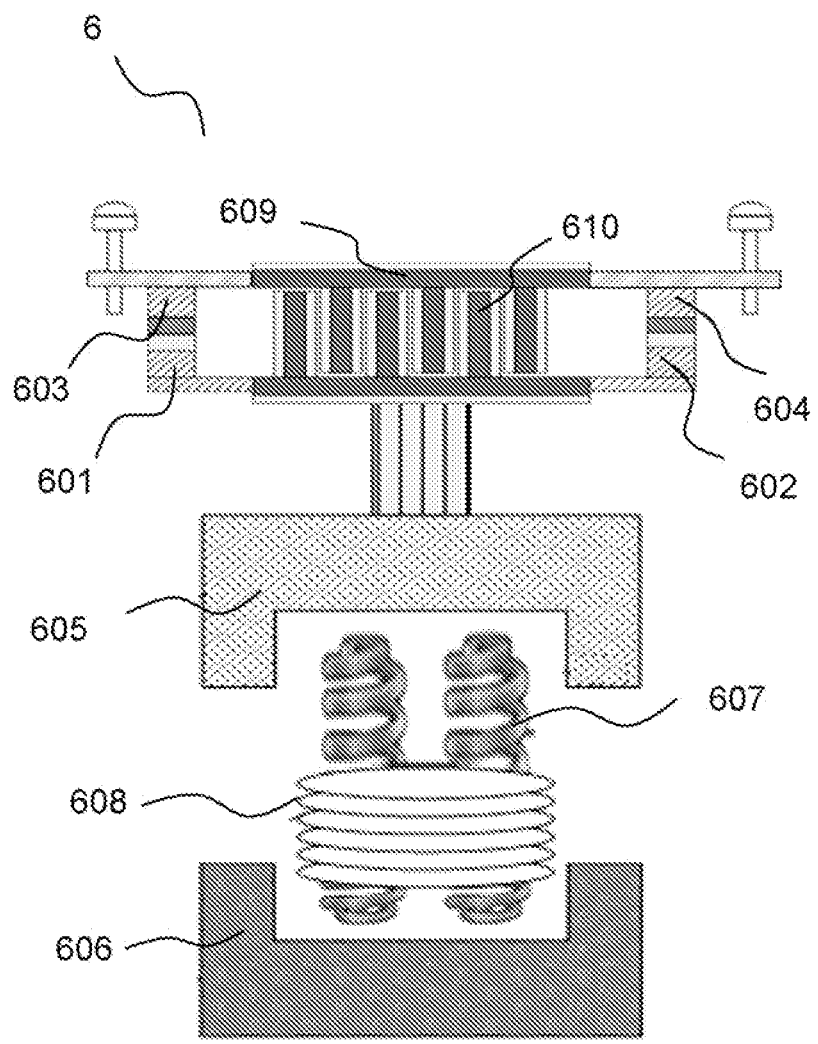

A plurality of electrostatic latches of the mesh structure in the third embodiment may be used as a keeping portion of a contactor to provide a stronger electrostatic attractive force for keeping a moving contact and a static contact in a contact state. FIG. 6a and FIG. 6b show a structure and an operating principle of an NO-type contactor according to the fifth embodiment. FIG. 6a shows an NO state of the contactor 6, and FIG. 6b shows that the contactor 6 is in a closed state under a keeping action of the keeping portion.

As shown in FIG. 6a and FIG. 5b, the contactor 6 is an NO-type contactor, including a contact portion and an actuation portion. The contact portion includes a pair of static contacts 603 and 604, a pair of moving contacts 601 and 602. The actuation portion includes an electromagnet 606, an armature 605, a coil 608, and a spring 607. Moreover, the NO-type contactor further includes a keeping portion. The keeping portion includes a pair of capacitor plates 609 and 610 and has the same basic structure as the keeping portion in the third embodiment. Specifically, the capacitor plate 609 and the capacitor plate 610 have a similar structure, where a plurality of protrusion plates particular to a substrate is disposed on the substrate, flexible electrodes made of thin metallic films are attached to two sides of the protrusion plate, and a very thin non-conductor dielectric film (not shown) is attached to each of the electrodes.

As shown in FIG. 6, the capacitor plate 609 are mechanically connected to the pair of static contacts 603 and 604 by bearing a structure of the pair of static contacts 603 and 604, and the capacitor plate 610 are mechanically connected to the pair of moving contacts 601 and 602 by bearing a structure of the pair of moving contacts 601 and 602. As shown in FIG. 6a, a current is not switched on for the coil 608. At this time, no interaction force exists between the electromagnet 606 and the armature 605, and the pair of static contacts 603 and 604 and the pair of moving contacts 601 and 602 are kept in a disconnection state. At this time, the contactor 6 is in the NO state shown in FIG. 6a.

As shown in FIG. 6b, when the current is switched on for the coil 608, the armature 605 and the electromagnet 606 are actuated to have magnetism of the same polarity. The armature 605 is opposite to the electromagnet 606 and is connected to the pair of moving contacts 601 and 602. When the armature 605 and the electromagnet 606 have the magnetism, the armature 605 moves away from the electromagnet 606 and stretches the spring 606 under the action of a repulsive force of the electromagnet 607. Once the pair of moving contacts 601 and 602 contacts the pair of static contacts 603 and 604, the pair of capacitor plates 609 and 610 in the keeping portion of the contactor 6 are meshed with each other so that multiple pairs of adjacent electrodes are jointed together, as shown in FIG. 6b. At this time, a voltage is applied to the keeping portion to charge the capacitor plates 609 and 610 so that the capacitor plates 609 and 610 carry charges of different polarities. In this way, a stronger electrostatic attractive force is generated at the multiple pairs of electrostatic latches formed between the capacitor plates 609 and 610, so that the pair of moving contacts 601 and 602 and the pair of static contacts 603 and 604 are fixedly locked (kept) in the contact state. At this time, the current in the coil 608 may be cancelled, and the contact state of the contactor 6 is maintained only by the electrostatic attractive force between the capacitor plates 609 and 610. In this way, the actuation portion does not consume power energy in the kept static state.

When application of the voltage to the keeping portion is stopped, the electrodes of the capacitor plates 609 and 610 do not carry the charges, and the electrostatic attractive force does not exist at multiple pairs of electrostatic latches between the capacitor plates 609 and 610. At this time, an elastic restoring force of the spring 607 pulls the armature 605 back to an original position shown in FIG. 6a, and the pair of moving contacts 601 and 602 connected to the armature 605 is also separated from the pair of static contacts 603 and 604 under the drawing of the armature 605, so the contactor 6 returns to the disconnection state shown in FIG. 6a.

According to this embodiment, the plurality of electrostatic latches of the mesh structure provides a stronger keeping force, thereby more stably keeping the switched-to closed state of the contactor and reducing static energy consumption of the contactor.

Sixth Embodiment

Figure 7A:
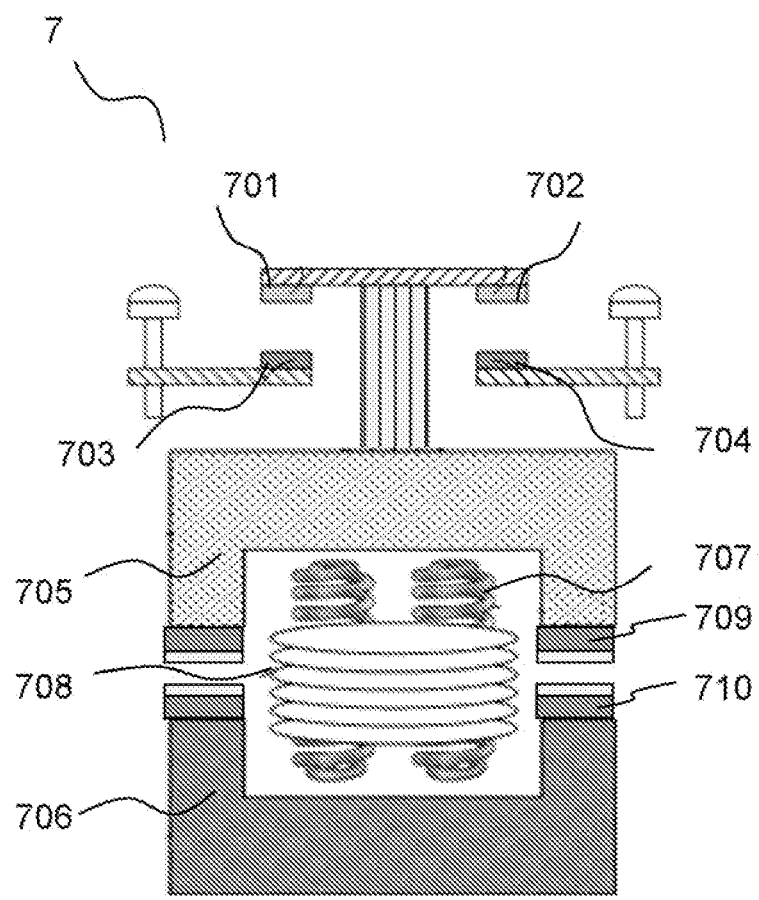
FIG. 7a and FIG. 7b are schematic structural diagrams of an NO-type contactor according to a sixth embodiment of the present invention.
Figure 7B:
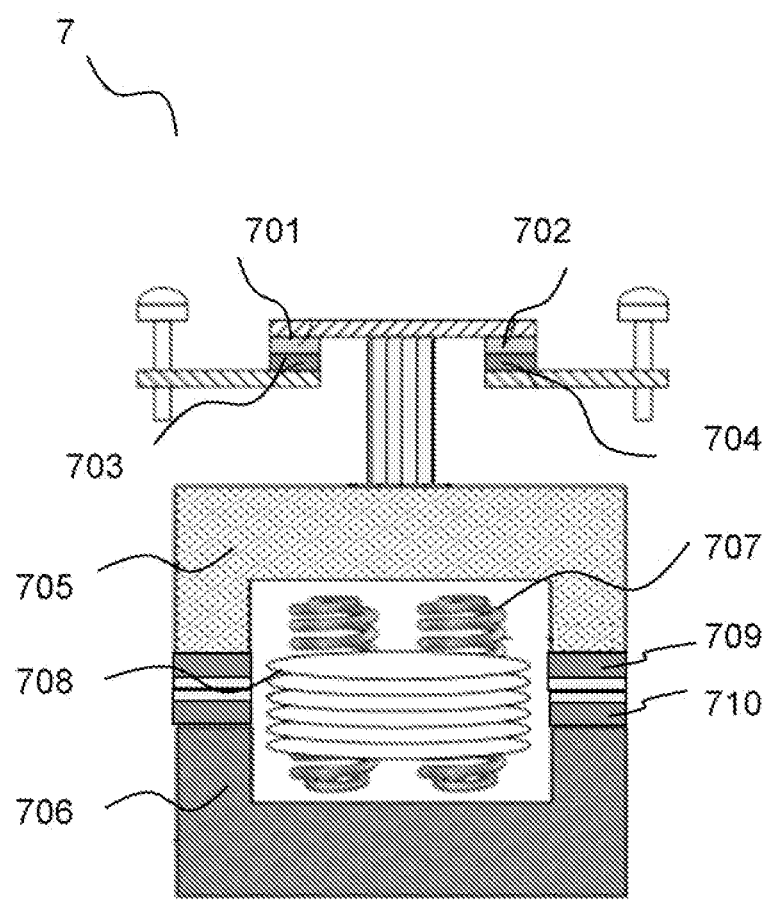

Like the fourth embodiment, this embodiment adopts the electrostatic latch in the first embodiment as a keeping portion of a contactor to provide an electrostatic attractive force for keeping a moving contact and a static contact in a contact state. Unlike the fourth embodiment, the electrostatic latch in this embodiment is formed by capacitor plates fixed on an electromagnet and an armature respectively. FIG. 7a and FIG. 7b show a structure and an operating principle of an NO-type contactor according to the fourth embodiment. FIG. 7a shows an NO state of the contactor 7, and FIG. 6b shows that the contactor 7 is in a closed state under a keeping action of the keeping portion.

As shown in FIG. 7a and FIG. 7b, the contactor 7 is an NO-type contactor, including a contact portion and an actuation portion. The contact portion includes a pair of static contacts 703 and 704, a pair of moving contacts 701 and 702. The actuation portion includes an electromagnet 706, an armature 705, a coil 708, and a spring 707. Moreover, the NO-type contactor further includes a keeping portion. The keeping portion includes capacitor plates 709 and 710 and has the same basic structure as the keeping portion in the first embodiment. The capacitor plates 709 and 710 are connected to opposite ends of the armature 705 and the electromagnet 706 respectively so that the capacitor plates 709 and 710 are opposite to each other to form a capacitor structure. In this embodiment, according to the number of the opposite ends of the armature 705 and the electromagnet 706, one or more pairs of capacitor structures formed by the capacitor plates 709 and 710 may be disposed. In FIG. 7, two pairs are disposed. As shown in FIG. 7a, a current is not switched on for the coil 708. At this time, no interaction force exists between the electromagnet 706 and the armature 705, and the pair of static contacts 703 and 704 and the pair of moving contacts 701 and 702 are kept in a disconnection state. At this time, the contactor 7 is in the NO state shown in FIG. 7a.

As shown in FIG. 7b, when the current is switched on for the coil 708, the armature 705 and the electromagnet 706 are actuated to have magnetism of opposite polarities. The armature 705 is opposite to the electromagnet 706 and is connected to the pair of moving contacts 701 and 702. When the armature 705 and the electromagnet 706 have the magnetism, the armature 705 moves towards the electromagnet 706 and compresses the spring 707 under the action of an attractive force of the electromagnet 706. Once the pair of moving contacts 701 and 702 contacts the pair of static contacts 703 and 704, the pair of capacitor plates 709 and 710 in the keeping portion of the contactor 7 is in a very close state or even the contact state, as shown in FIG. 7b. At this time, a voltage is applied to the keeping portion to charge the capacitor plates 709 and 710 so that the capacitor plates 709 and 710 carry charges of different polarities. In this way, a strong electrostatic attractive force is generated between the capacitor plates 709 and 710, so that the pair of moving contacts 701 and 702 and the pair of static contacts 703 and 704 are fixedly locked (kept) in the contact state. At this time, the current in the coil 708 may be cancelled, and the contact state of the contactor 7 is maintained only by the electrostatic attractive force between the capacitor plates 709 and 710. In this way, the actuation portion does not consume power energy in the kept static state.

When application of the voltage to the keeping portion is stopped, the capacitor plates 709 and 710 do not carry the charges, and the electrostatic attractive force does not exist between the capacitor plates 709 and 710. At this time, an elastic restoring force of the spring 707 pushes the armature 705 back to an original position shown in FIG. 7a, and the pair of moving contacts 701 and 702 connected to the armature 705 is also separated from the pair of static contacts 703 and 704 under the drawing of the armature 705, so the contactor 7 returns to the disconnection state shown in FIG. 7a.

According to this embodiment, the electrostatic latch keeps the closed state of the contactor to reduce the static energy consumption, and the electrostatic latch is not directly connected to the contact, so that the contact of the contactor is designed more flexibly and manufactured more conveniently.

Seventh Embodiment

Figure 8A:
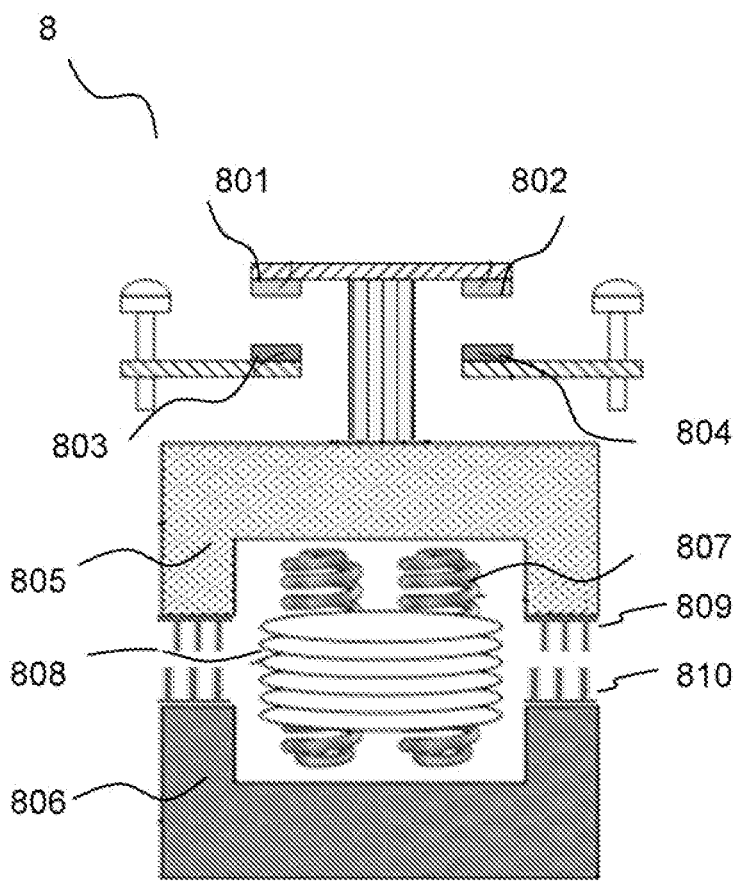
FIG. 8a and FIG. 8b are schematic structural diagrams of an NO-type contactor according to a seventh embodiment of the present invention.
Figure 8B:
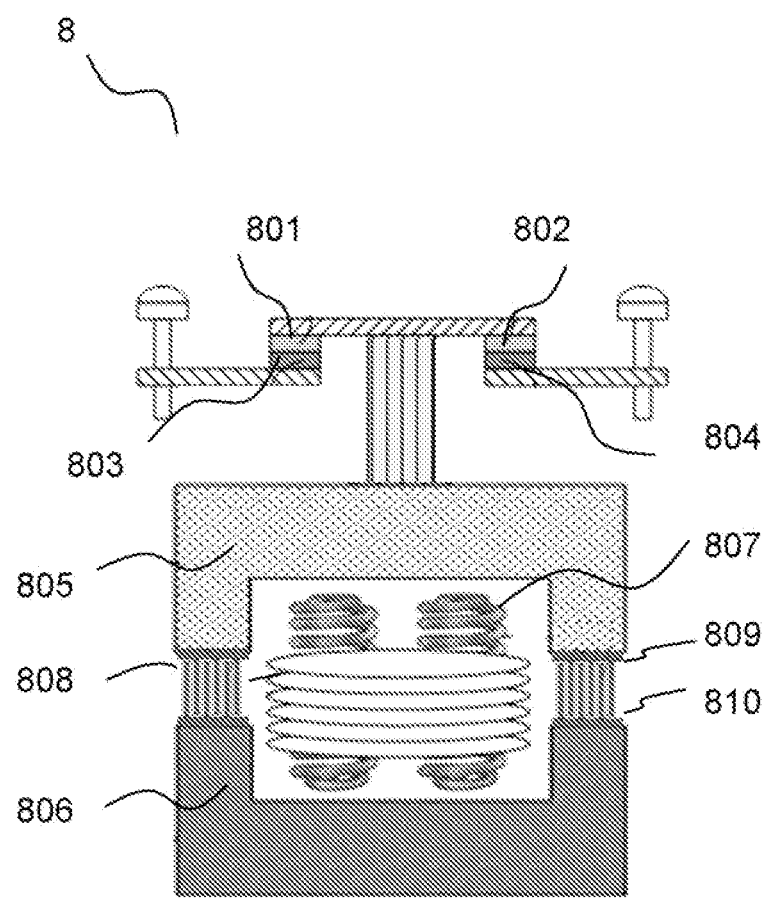

Like the fifth embodiment, this embodiment adopts the plurality of electrostatic latch of the mesh structure in the third embodiment as a keeping portion of a contactor to provide a stronger electrostatic attractive force for keeping a moving contact and a static contact in a contact state. Unlike the fifth embodiment, the electrostatic latch in this embodiment is formed by capacitor plates fixed on an electromagnet and an armature respectively, and the capacitor plates may form the plurality of electrostatic latch of the mesh structure. FIG. 8a and FIG. 8b show a structure and an operating principle of an NO-type contactor according to the seventh embodiment. FIG. 8a shows an NO state of the contactor 8, and FIG. 8b shows that the contactor 8 is in a closed state under a keeping action of the keeping portion.

As shown in FIG. 8a and FIG. 8b, the contactor 8 is an NO-type contactor, including a contact portion and an actuation portion. The contact portion includes a pair of static contacts 803 and 804, a pair of moving contacts 801 and 802. The actuation portion includes an electromagnet 806, an armature 805, a coil 808, and a spring 807. Moreover, the NO-type contactor further includes a keeping portion. The keeping portion includes capacitor plates 809 and 810 and has the same basic structure as the keeping portion in the third embodiment. Specifically, the capacitor plate 809 and the capacitor plate 810 have a similar structure, where a plurality of protrusion plates particular to a substrate is disposed on the substrate, flexible electrodes made of thin metallic films are attached to two sides of the protrusion plate, and a very thin non-conductor dielectric film (not shown) is attached to each of the electrodes.

As shown in FIG. 8, the capacitor plates 809 and 810 are connected to opposite ends of the armature 805 and the electromagnet 806 respectively so that the capacitor plates 809 and 810 are opposite to each other to form a capacitor structure. In this embodiment, according to the number of the opposite ends of the armature 805 and the electromagnet 806, one or more pairs of capacitor structures formed by the capacitor plates 809 and 810 may be disposed. In FIG. 8, two pairs are disposed. As shown in FIG. 8a, a current is not switched on for the coil 808. At this time, no interaction force exists between the electromagnet 806 and the armature 805, and the pair of static contacts 803 and 804 and the pair of moving contacts 801 and 802 are kept in a disconnection state. At this time, the contactor 8 is in the NO state shown in FIG. 8a.

As shown in FIG. 8b, when the current is switched on for the coil 808, the armature 805 and the electromagnet 806 are actuated to have magnetism of opposite polarities. The armature 805 is opposite to the electromagnet 806 and is connected to the pair of moving contacts 801 and 802. When the armature 805 and the electromagnet 806 have the magnetism, the armature 805 moves towards the electromagnet 806 and compresses the spring 807 under the action of an attractive force of the electromagnet 808. Once the pair of moving contacts 801 and 802 contacts the pair of static contacts 803 and 804, the pair of capacitor plates 809 and 810 in the keeping portion of the contactor 8 are meshed with each other so that multiple pairs of adjacent electrodes are jointed together, as shown in FIG. 8b. At this time, a voltage is applied to the keeping portion to charge the capacitor plates 809 and 810 so that the capacitor plates 809 and 810 carry charges of different polarities. In this way, a stronger electrostatic attractive force is generated at the multiple pairs of electrostatic latches formed between the capacitor plates 809 and 810, so that the pair of moving contacts 801 and 802 and the pair of static contacts 803 and 804 are fixedly locked (kept) in the contact state. At this time, the current in the coil 808 may be cancelled, and the contact state of the contactor 8 is maintained only by the electrostatic attractive force between the capacitor plates 809 and 810. In this way, the actuation portion does not consume power energy in the kept static state.

When application of the voltage to the keeping portion is stopped, the electrodes of the capacitor plates 809 and 810 do not carry the charges, and the electrostatic attractive force does not exist at multiple pairs of electrostatic latches between the capacitor plates 809 and 810. At this time, an elastic restoring force of the spring 807 pushes the armature 805 back to an original position shown in FIG. 8a, and the pair of moving contacts 801 and 802 connected to the armature 805 is also separated from the pair of static contacts 803 and 804 under the drawing of the armature 805, so the contactor 8 returns to the disconnection state shown in FIG. 8a.

According to this embodiment, the plurality of electrostatic latches of the mesh structure provides a stronger keeping force, thereby more stably keeping the closed state of the contactor; moreover, the electrostatic latch keeps the closed state of the contactor to reduce the static energy consumption, and the electrostatic latch is not directly connected to the contact, so that the contact of the contactor is designed more flexibly and manufactured more conveniently.

Eighth Embodiment

The eighth embodiment is similar to the sixth embodiment. The difference is that, in the sixth embodiment, the moving contact of the NO-type contactor is above the static contact in the figure, as shown in FIG. 7, while a moving contact of an NO-type contactor in the eighth embodiment is below a static contact.

In this embodiment, when a current is switched on for a coil, an armature moves away from an electromagnet and stretches a spring under the action of a repulsive force of the electromagnet. Once a pair of moving contacts and a pair of static contacts are in contact with each other, a voltage is applied to a keeping portion so that opposite capacitor plates carry charges of the same polarity. In this way, a strong electrostatic repulsive force is generated between the capacitor plates, so that the pair of moving contacts and the pair of static contacts are locked in a contact state. When application of the voltage to the keeping portion is stopped, the electrostatic repulsive force does not exist between the capacitor plates. At this time, an elastic restoring force of the spring pulls the armature back to an original position, and the pair of moving contacts and the pair of static contacts are separated.

Ninth Embodiment

The ninth embodiment is similar to the seventh embodiment. The difference is that, in the seventh embodiment, the moving contact of the NO-type contactor is above the static contact in the figure, as shown in FIG. 8, while the moving contact of the NO-type contactor in the ninth embodiment is below the static contact.

In this embodiment, when a current is switched on for a coil, an armature moves away from an electromagnet and stretches the spring under the action of a repulsive force of the electromagnet. Once a pair of moving contacts and a pair of static contacts are in contact with each other, a voltage is applied to a keeping portion so that opposite capacitor plates carry charges of the same polarity. In this way, a strong electrostatic attractive force is generated between the capacitor plates, so that the pair of moving contacts and the pair of static contacts are locked in a contact state. When application of the voltage to the keeping portion is stopped, the electrostatic repulsive force does not exist between the capacitor plates. At this time, an elastic restoring force of the spring pulls the armature back to an original position, and the pair of moving contacts and the pair of static contacts are separated.

It can be seen from the embodiments that, in the present invention, the electrostatic latch is used as the keeping portion to provide the keeping force in the static state (the closed state for the NO-type contactor; the disconnection state for the NC-type contactor) after status switching of the contactor, thereby reducing the energy consumption in the static state. During the specific implementation of the present invention, persons skilled in the art can dispose the keeping portion at different positions in the contactor (for example, a position of the contact portion in the fourth and fifth embodiments; a position of the actuation portion in the sixth to ninth embodiments), and the structure and size of the electrostatic latch may also be flexibly designed by persons skilled in the art based on the requirements for the keeping force (for example, a single electrostatic latch structure is adopted in the fourth, sixth, and eighth embodiments, and the plurality of electrostatic latches of the mesh structure is adopted in the fifth, seventh, and ninth embodiments), as long as after the status switching of the contactor, the keeping portion can provide enough strong keeping force through the electrostatic force so that the contact portion is kept in the switched-to static state, which falls within the protection scope of the present invention.

It should be noted again that, the embodiments of the present invention are described by taking the NO-type contactor as an example in the foregoing description. Persons skilled in the art may also easily design a different type of NC-type contactor according to the principle and script of the present invention. For example, if the NC-type contactor is used in the fourth and fifth embodiments, the electromagnet and armature in the actuation portion may be adjusted so that after the current is switched on for the coil, the armature compresses the spring under the attractive force of the electromagnet. At this time, the capacitor plates of the keeping portion may carry charges of the same polarity and use the generated repulsive force to keep the switched-to disconnection state of the contactor. If the NC-type contactor is used in the sixth and seventh embodiments, the electromagnet and armature in the actuation portion may also be adjusted so that after the current is switched on for the coil, the armature stretches the spring under the repulsive force of the electromagnet. At this time, the capacitor plates of the keeping portion may carry charges of the same polarity and use the generated repulsive force to keep the switched-to disconnection state of the contactor. If the NC-type contactor is used in the eighth and ninth embodiments, the electromagnet and armature in the actuation portion may be adjusted so that after the current is switched on for the coil, the armature compresses the spring under the attractive force of the electromagnet. At this time, the capacitor plates of the keeping portion may carry charges of different polarities and use the generated attractive force to keep the switched-to disconnection state of the contactor. Overall, the protection scope of the present invention is not limited to a specific NO-type or NC-type contactor.

It can be seen that, in the contactor of at least one embodiment of the present invention, the electrostatic latch structure is used as the keeping portion, and the electrostatic force between the capacitor plates of the electrostatic latch structure is used to keep the contact portion in the contact state or the disconnection state after the contactor is switched to the non-normal state. Through the technical solution of at least one embodiment of the present invention, the strong electrostatic force generated by the electrostatic latch is used to keep the contactor in the switched-to static state. Compared with the conventional electromagnetic contactor, the contactor used in at least one embodiment of the present invention greatly reduces the energy consumption in the static state, is convenient to manufacture, and has a low cost.

The present invention is shown and described in detail through the accompanying drawings and the example embodiments. However, the present invention is not limited to the disclosed embodiments, and other solutions derived by persons skilled in the art according to the embodiments also fall within the protection scope of the present invention.

What is claimed is:

1. A contactor, comprising:
   a contact portion;
   a keeping portion, including a capacitor structure, the keeping portion being configured to use an electrostatic force between opposite capacitor plates of the capacitor structure to keep the contact portion in a contact state or a disconnection state; and
   an actuation portion, including an electromagnet and an armature, one of the opposite capacitor plates of the capacitor structure being connected to the electromagnet and another one of the opposite capacitor plates of the capacitor structure being connected to the armature,
   wherein, upon the actuation portion causing the contact portion to switch to a contact state or a disconnection state, the opposite capacitor plates in the capacitor structure of the keeping portion are capable of carrying charges of opposite polarities or a same polarity, and an electrostatic attractive/repulsive force is generated between the electrodes of the opposite capacitor plates to keep the contact portion in the switched-to contact state or disconnection state.

2. The contactor of claim 1, wherein
   each of the capacitor plates of the capacitor structure includes
   an electrode and a dielectric film attached to a surface of the electrode and wherein, after the actuation portion, each of the capacitor plates of the capacitor structure is configured to cause the contact portion to switch to the contact state/disconnection state, the opposite capacitor plates in the capacitor structure of the keeping portion being capable of carrying charges, and an electrostatic force being generated between the electrodes of the capacitor plates to keep the contact portion in the switched-to contact state/disconnection state.

3. The contactor of claim 2, wherein
the electrode of the capacitor plate is a flexible thin metallic film.

4. The contactor of claim 3, wherein
the capacitor plate further comprises a substrate, and wherein the flexible thin metallic film electrode is attached to the substrate.

5. The contactor of claim 2, wherein
the dielectric film is ebonite, polytetrafluoroethylene (PTFE), or ceramics.

6. The contactor of claim 1, wherein
each of the opposite capacitor plates of the capacitor structure further comprise a substrate, a plurality of protrusion plates being disposed on each of the substrates of the opposite capacitor plates, the plurality of protrusion plates of one of the opposite capacitor plates being capable of meshing with the plurality of protrusion plates of the other one of the opposite capacitor plates, and the electrode being disposed on both surfaces of each of the plurality of protrusion plates; and wherein, after the actuation portion causes the contact portion to switch to the contact state/disconnection state, the electrodes of the protrusion plates of the opposite capacitor plates are capable of carrying charges of opposite polarities or the same polarity, and an electrostatic attractive/repulsive force is generated between adjacent electrodes in a mesh state to keep the contact portion in the switched-to contact state/disconnection state.

* * * * *